Figure 1:
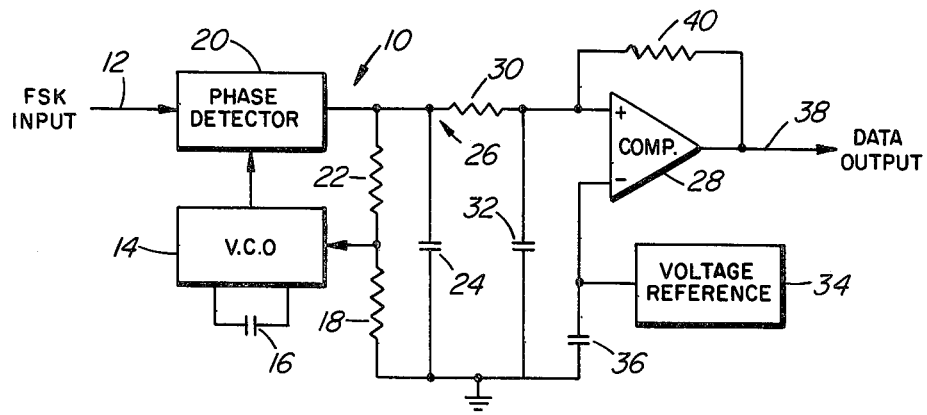

United States Patent [19]

Carsten

[11] Patent Number: 4,488,120
[45] Date of Patent: Dec. 11, 1984

[54] FREQUENCY SHIFT KEYING DEMODULATOR USING A PHASE LOCKED LOOP AND VOLTAGE COMPARATOR

[75] Inventor: Ralph T. Carsten, Nepean, Canada
[73] Assignee: Northern Telecom Limited, Montreal, Canada
[21] Appl. No.: 358,202
[22] Filed: Mar. 15, 1982
[51] Int. Cl.³ .............................................. H03D 3/22
[52] U.S. Cl. .................................. 329/122; 329/124; 331/DIG. 2; 331/23; 331/12; 375/76
[58] Field of Search ................. 329/50, 110, 122, 124, 329/133; 331/DIG. 2; 375/45, 47, 51, 76, 78, 81, 88, 90, 120

[56] References Cited

U.S. PATENT DOCUMENTS

| | | | |
|---|---|---|---|
| 3,164,773 | 1/1965 | Daniel | 375/76 |
| 3,543,169 | 11/1970 | Hill | 330/11 X |
| 3,688,205 | 8/1972 | Burger | 375/76 X |
| 3,909,735 | 9/1975 | Anderson et al. | 331/DIG. 2 X |
| 4,237,424 | 12/1980 | Weiner | 375/76 X |
| 4,463,317 | 7/1984 | Kuskabe | 329/103 |

FOREIGN PATENT DOCUMENTS 3022287 12/1981 Fed. Rep. of Germany ........ 375/45
0004603 1/1982 Japan .................................. 329/103

OTHER PUBLICATIONS

Exar Integrated Systems, Inc., Specification Sheets for XR-2211 FSK Demodulator/Tone Decoder Integrated Circuit.

*Primary Examiner*—Eugene R. Laroche
*Assistant Examiner*—W. R. Paxman
*Attorney, Agent, or Firm*—R. John Haley

[57] ABSTRACT

In an FSK demodulator, the output of the phase detector of a phase locked loop (PLL) is capacitively coupled to one input of an FSK voltage comparator, the capacitive coupling blocking d.c. and d.c. being restored at the comparator input by diodes connected between the two comparator inputs. The other input of the comparator is supplied with a reference voltage corresponding to a nominal center frequency of the FSK signals. A buffer amplifier permits rapid charging of the coupling capacitor, which is set to a determined state when there is no phase lock of the PLL. The arrangement facilitates demodulation of narrow-band FSK signals whose center frequency is subject to change.

11 Claims, 4 Drawing Figures

FREQUENCY SHIFT KEYING DEMODULATOR USING A PHASE LOCKED LOOP AND VOLTAGE COMPARATOR

This invention relates to FSK (frequency shift keying) demodulators.

In U.S. patent application No. 33,664, now U.S. Pat. No. 4,456,985, filed Dec. 23, 1981 by R. T. Carsten et al. and entitled "Apparatus for Coupling Signals To or From a Two-Wire Line", there is described an arrangement in which full-duplex above voice-band FSK data may be transmitted simultaneously with telephony signals over a subscriber's telephone line. In such an arrangement the FSK frequencies must be selected for minimal influence on or by telephony signals which may be present, and they must be sufficiently high to distinguish them from voice-band signals and sufficiently low that they are not unduly attenuated by the telephone line. For example, the FSK center frequencies may be 22 kHz and 36 kHz for the two directions of transmission, each center frequency being changed by ±500 Hz depending on whether a data 0 or 1 is being transmitted.

In a system using such an arrangement for many subscribers, FSK frequencies must be determined individually at the location of each subscriber, so that the cost of achieving this is important. Although crystal controlled oscillators and frequency dividers could be used to determine the FSK frequencies accurately, this would involve undesired relatively high costs. Accordingly, it is preferred to use relatively low-cost components, such as timing capacitors and resistors, to determine the FSK frequencies. However, in consequence the FSK center frequencies are relatively inaccurately determined and may be subject to change due to the combined effects of component tolerances, aging, and temperature changes.

With conventional FSK demodulation, the effect of an incorrect center frequency in the incoming FSK data is to produce a distorted mark/space ratio in the demodulated data. In the arrangement discussed above the distortion can be severe because the change in the FSK center frequency can be significant compared with the narrow band (±500 Hz) which is used for the FSK transmission. Such distortion can lead to errors in examining the demodulated data if transitions of the demodulated data are used to determine the times at which this data is sampled. This condition can be avoided by using an appropriate transmission code for the FSK transmission, but this would restrict the overall data transmission rate for the same transmission speed on the telephone line. As the overall data transmission rate is already relatively restricted in the arrangement described, the use of a transmission code with a consequent further reduction in this rate is desirably avoided.

Accordingly, an object of this invention is to provide an FSK demodulator which can be used to demodulate narrow band FSK data with reduced distortion of the mark/space ratio of the demodulated data in the event of a variable FSK center frequency.

According to one aspect of this invention there is provided an FSK demodulator comprising: a phase locked loop which is responsive to an FSK input signal to produce an output voltage which varies, in dependence upon the FSK input signal, about a voltage corresponding to a center frequency of the FSK input signal, the phase locked loop including means for detecting phase lock; means for applying a d.c. reference voltage, corresponding to a nominal center frequency of the FSK input signal, to a first input of the voltage comparator; d.c. blocking means comprising a coupling capacitor for coupling the output voltage of the phase locked loop to a second input of the voltage comparator; d.c. restoring means for maintaining said second input of the voltage comparator at substantially said d.c. reference voltage; and means responsive to the phase lock detecting means for establishing a determinate state of the coupling capacitor when no phase lock is detected.

Thus the d.c. component of the output voltage of the phase locked loop, which corresponds to the actual center frequency of the FSK input signal, is blocked and is replaced at the second input of the voltage comparator with substantially the d.c. reference voltage which corresponds to the nominal center frequency of the FSK input signal, which reference voltage is also supplied to the first input of the voltage comparator so that the mark/space ratio of the demodulated output signal is not distorted.

The d.c. restoring means preferably comprises diode means, such as two series-connected oppositely-poled (back-to-back) zener diodes, connected between the first and second inputs of the voltage comparator.

The demodulator preferably includes a low pass filter for coupling the output voltage of the phase locked loop to the d.c. blocking means.

According to another aspect of this invention there is provided an FSK demodulator comprising: a phase locked loop including a voltage controlled oscillator, means for tuning said oscillator to a nominal center frequency of an FSK signal to be demodulated, a phase detector responsive to an output of said oscillator and to an FSK input signal to produce at an output thereof an output voltage which varies, in dependence upon the FSK input signal, about a voltage corresponding to a center frequency of the FSK input signal, and detecting means for detecting phase lock of said phase locked loop; a voltage comparator for producing a demodulated output signal; means for producing and applying to a first input of the voltage comparator a reference voltage representative of said nominal center frequency; an amplifier stage having an input coupled to the output of the phase detector and having an output; a capacitor coupling the output of the amplifier stage to a second input of the voltage comparator; d.c. restoring means for providing said second input of the voltage comparator with a d.c. component substantially equal to said reference voltage; and means responsive to said detecting means for establishing a determinate state of said capacitor when no phase lock is detected.

The means responsive to said detecting means preferably comprises means, for example a transistor controlled by said detecting means and having its controlled path connected between the means for producing the reference voltage and the input of the amplifier stage, for applying substantially said reference voltage to the input of the amplifier stage when no phase lock is detected, and preferably also comprises means for applying a determinate voltage to the second input of the voltage comparator when no phase lock is detected.

Figure 2:
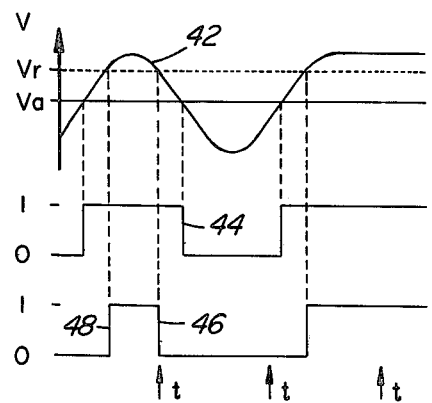
Figure 3:
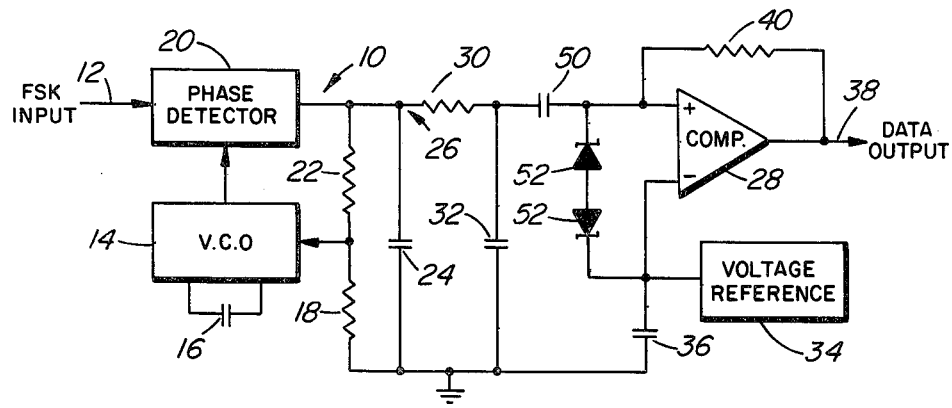
Figure 4:
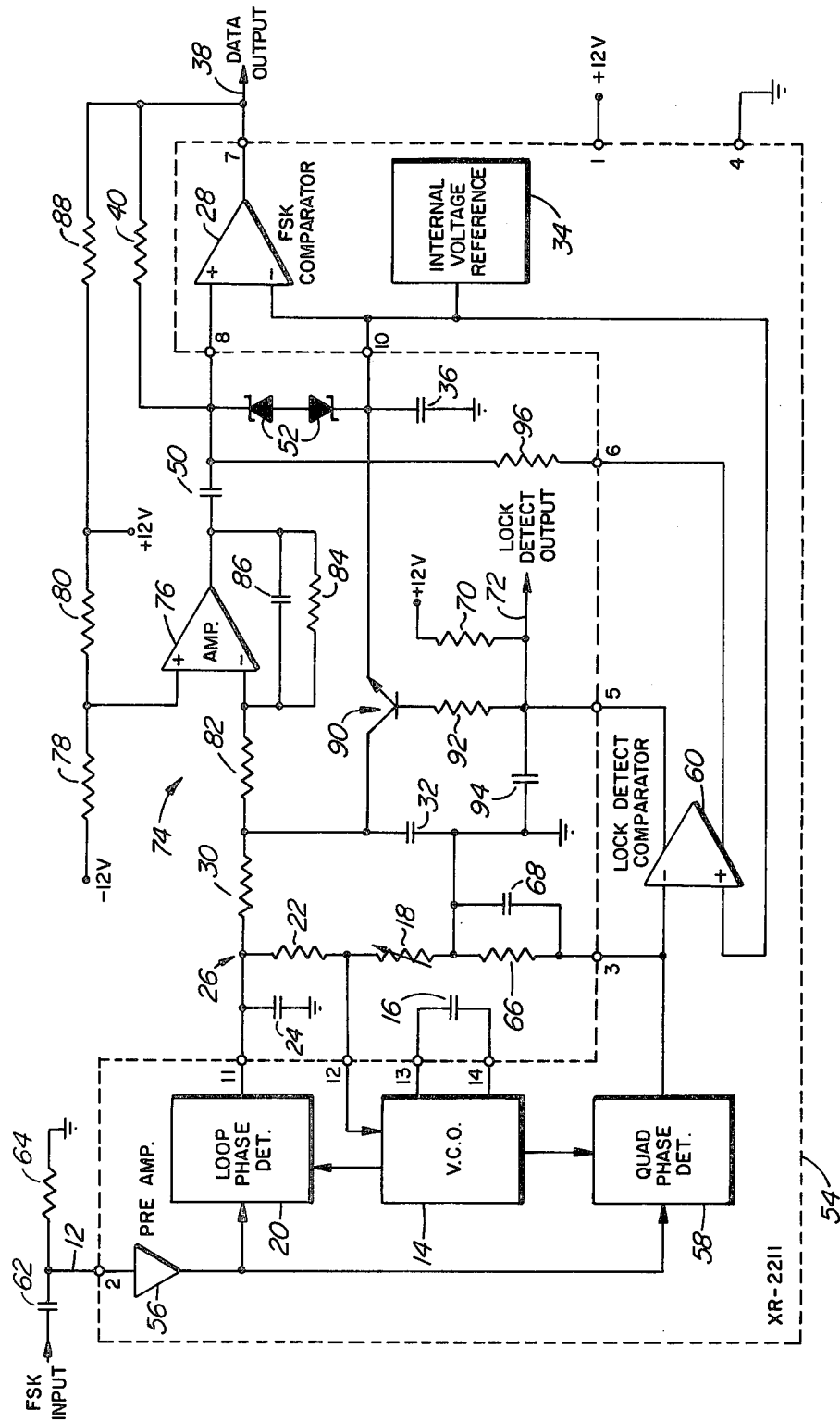

The invention will be further understood from the following description with reference to the accompanying drawings, in which:

FIG. 1 schematically illustrates a known form of FSK demodulator;

FIG. 2 is a waveform diagram relating to the operation of an FSK demodulator;

FIG. 3 schematically illustrates an FSK demodulator in accordance with the invention; and FIG. 4 illustrates in detail an FSK demodulator in accordance with a preferred embodiment of the invention.

Referring to FIG. 1, a known form of FSK demodulator comprises a phase locked loop (PLL) 10 to which an FSK input signal is supplied via a wire 12. The PLL 10 comprises a voltage controlled oscillator (VCO) 14, whose center frequency is determined by the magnitudes of a timing capacitor 16 and a resistor 18 connected to a control input of the VCO, a phase detector 20 which is supplied with the FSK input signal on the wire 12 and the output of the VCO 14, and a PLL filter comprising a resistor 22 and a capacitor 24 which are connected between the output of the phase detector 20 and respectively the control input of the VCO and circuit ground.

The output voltage of the PLL, produced at a junction 26, is coupled to the non-inverting input of a voltage comparator 28 via a low pass data filter comprising a series resistor 30 and a shunt capacitor 32. A reference voltage, which corresponds to the nominal center frequency of the FSK input signal, is supplied from a voltage reference source 34 to the inverting input of the comparator 28, which is also coupled to circuit ground via a capacitor 36. The demodulated data output is produced on a wire 38 connected to the output of the comparator 28, which is also coupled to the non-inverting input of the comparator via a resistor 40 to provide positive feedback for rapid switching of the comparator.

FIG. 2 shows waveforms illustrating the operation of the FSK demodulator, the upper diagram illustrating the output voltage 42 of the PLL at the junction 26, and the middle and lower diagrams illustrating possible forms of the resultant data output on the wire 38, for an arbitrary data bit sequence having equal marks and spaces.

As shown in FIG. 2, the voltage 42 at the junction 26 varies uniformly on either side of a voltage Va which corresponds to the actual center frequency of the FSK input signal. If the voltage Va is equal to the reference voltage supplied by the source 34, and thus if the actual center frequency is equal to the nominal center frequency to which the VCO 14 is tuned, then the resultant demodulated data has an undistorted mark/space ratio as shown by the waveform 44 in the middle diagram of FIG. 2. If, however, the actual center frequency of the FSK input signal has changed from the nominal center frequency, so that the voltage Va differs from the reference voltage, then the mark/space ratio of the demodulated data is distorted. For example if relative to the voltage Va the reference voltage is Vr as shown by a dotted line in the upper diagram of FIG. 2, then the resultant demodulated data has the waveform 46 in the lower diagram of FIG. 2. If transitions such as the 0-to-1 transition 48 of the waveform 46 are used to determine sampling times t for sampling the demodulated data, errors can occur in the sampled data due to the distorted mark/space ratio of the waveform 46.

FIG. 3 illustrates an FSK demodulator in accordance with the invention, in which the above-described disadvantage of the prior art is avoided or at least substantially reduced. The demodulator of FIG. 3 is the same as that of FIG. 1, and the components thereof are accordingly designated by the same references, except for the addition in the demodulator of FIG. 3 of a capacitor 50 and two zener diodes 52. The capacitor 50 serves to couple the output of the data filter, comprising the resistor 30 and the capacitor 32, to the non-inverting input of the comparator 28, in place of the direct connection in FIG. 1. Thus the capacitor 50 blocks the d.c. component Va of the PLL output from being applied to the comparator 28. The zener diodes 52, which are series-connected and oppositely-poled, are connected between the non-inverting input of the comparator 28 and the voltage reference source 34, and hence between the two inputs of the comparator 28, to maintain the average voltage level at the non-inverting input of the comparator 28 at substantially the reference voltage Vr.

Thus the capacitor 50 blocks the d.c. component Va, and the diodes 52 restore a d.c. component Vr, in the output voltage of the PLL 10 before application thereof to the comparator 28. As the d.c. component Vr is supplied to both inputs of the comparator 28, the mark/space ratio of the demodulated data at the output of the comparator is relatively undistorted. This is the case even for large changes (within the PLL capture range which should be much larger than the range over which the actual center frequency is expected to vary) of the actual center frequency of the FSK input signal from the nominal center frequency, and hence for large differences between the voltages Va and Vr.

In place of the two zener diodes 52 other d.c. restoring means, for example other diode means such as back-to-back conventional diodes or varistors, may be used to maintain the non-inverting input of the comparator 28 at substantially the d.c. reference voltage.

A problem which may arise with the capacitive coupling arrangement shown in FIG. 3 is that, in the absence of phase lock such as occurs if no FSK input signal is present, the capacitor 50 may adopt a charge which adversely affects operation of the FSK demodulator when an FSK input signal appears and phase lock is achieved. In order to avoid this, in a preferred embodiment of the invention described below with reference to FIG. 4 means are provided for determining the charge on the capacitor when there is no phase lock.

In FIG. 4 the same references as in FIGS. 1 and 3 are used to denote similar components, which accordingly are not described again below. The components 14, 20, 28, and 34 form part of an integrated circuit type XR-2211 by Exar Integrated Systems, Inc., which integrated circuit is shown within a broken line box 54 in FIG. 4, which also shows the pin numbers for connections to the integrated circuit. In addition to the components 14, 20, 28, and 34, the integrated circuit includes an FSK input signal pre-amplifier 56, a quadrature phase detector 58, and a lock detect comparator 60.

The FSK input signal is coupled via a capacitor 62 to the wire 12, which is coupled to circuit ground via a high impedance resistor 64 and is connected to the input pin 2 of the pre-amplifier 56. The output of the pre-amplifier 56 is connected to the loop phase detector 20 and also to the quadrature phase detector 58, whose output pin 3 is coupled to circuit ground via a parallel resistor 66 and capacitor 68 to eliminate chatter at output pins 5 and 6 described below. The output of the detector 58 is also connected to the inverting input, and the internal voltage reference is applied to the non-inverting input, of the lock detect comparator 60, which has complementary open-collector outputs at pins 5 and 6. A pull-up resistor 70 is connected to the pin 5 output, which provides a lock detect output on a wire 72 and is high when the PLL is out of lock and low when the PLL is locked.

Instead of the junction 26 being coupled directly via the resistor 30 of the data filter to the non-inverting input pin 8 of the comparator 28 as in the prior art, in the demodulator of FIG. 4 the junction 26 is coupled to this input pin 8 via the resistor 30, an inverting amplifier stage 74, and the coupling capacitor 50. The amplifier stage 74 comprises a differential amplifier 76 having a non-inverting input to which a fixed potential is applied from a voltage divider comprising resistors 78 and 80, an inverting input to which the output of the data filter is coupled via a resistor 82, and an output which is coupled to the inverting input via a feedback resistor 84 in parallel with a frequency compensation capacitor 86 and which output is also connected to the capacitor 50, optionally via a low impedance (e.g. 10 ohms) current-limiting resistor (not shown).

The amplifier stage 74 acts as a buffer to provide a low impedance source for the capacitor 50, so that the charging time of the capacitor 50 does not adversely affect the demodulation process. The amplifier stage 74 is inverting so that a high level of the data output wire 38 is produced in response to the higher frequency of the FSK input signal and a low level is produced in response to the lower frequency of the FSK input signal. A pull-up resistor 88 is connected to the output pin 7 of the comparator 28.

In order to ensure rapid and accurate demodulation of data at the start of a data burst which may follow a period during which there is no FSK input signal so that the PLL is not locked, the demodulator of FIG. 4 includes means for establishing a determinate state of the capacitor 50 when there is no phase lock. This means comprises an NPN transistor 90 having its emitter connected to the voltage reference source 34 output pin 10, its collector connected to the junction between the resistors 30 and 82 and hence to the input of the amplifier stage 74, and its base connected via a current limiting resistor 92 to the pin 5 output of the comparator 60, which output is also connected to circuit ground via a noise suppression capacitor 94 to remove the effects of noise at the input pin 2 of the PLL in the absence of an FSK input signal. This means further comprises a resistor 96 coupled between the pin 6 output of the comparator 60 and the non-inverting input pin 8 of the comparator 28, which is connected to the output side of the capacitor 50 as already described.

In the absence of phase lock, the pin 5 output of the comparator 60 is pulled high by the pull-up resistor 70 so that the transistor 90 is turned on to hold the input to the amplifier stage 74 substantially at the reference voltage supplied by the source 34. This voltage corresponds to the average voltage level which should be present at this point in the presence of an FSK input signal, so that unnecessary charging of the capacitor 50 at the start of a data burst is avoided. With phase lock in the presence of an FSK input signal the output pin 5 of the comparator 60 is low so that the components 90, 92, and 94 have no effect.

In the absence of phase lock the pin 6 output of the comparator 60 is low so that the resistor 96 forms with the feedback resistor 40 of the comparator 28 a potential divider to apply to the non-inverting input of the comparator 28, and hence to the output side of the capacitor 50, a voltage which has one of two possible values determined by the last state of the data output wire 38, and which in any event is repeatable for different data bursts. Thus the capacitor 50 is always in a repeatable, determinate state at the start of each data burst to enable accurate demodulation. With phase lock in the presence of an FSK input signal the voltage at the output pin 6 floats (no pull-up resistor is provided) so that the component 96 has no effect.

By way of further explanation and example, in a demodulator as shown in FIG. 4 for demodulating an FSK input signal having a nominal center frequency of 36 kHz and with the two FSK frequencies being 500 Hz above and below the center frequency, with a data rate of 1200 bits/second, the various components can have the following values:

| Reference | Value | Reference | Value |
|---|---|---|---|
| 16 | 3nF | 66 | 470kΩ |
| 18 | 8.45kΩ fixed in series with 1kΩ variable | 68 | 1nF |
|  |  | 70 | 10kΩ |
|  |  | 78 | 68kΩ |
| 22 | 180kΩ | 80 | 33kΩ |
| 24 | 1.2nF | 82 | 110kΩ |
| 30 | 100kΩ | 84 | 270kΩ |
| 32 | 2.2nF | 86 | 150pF |
| 36 | 0.1μF | 88 | 5.1kΩ |
| 40 | 510kΩ | 92 | 33kΩ |
| 50 | 0.1μF | 94 | 8.2nF |
| 62 | 0.1μF | 96 | 300kΩ |
| 64 | 10MΩ |  |  |

Although particular embodiments of the invention have been described the invention is not limited to the details of these, and numerous modifications, variations, and adaptations may be made without departing from the scope of the invention as defined in the claims.

What is claimed is:

1. An FSK demodulator comprising:
   a phase locked loop which is responsive to an FSK input signal to produce an output voltage which varies, in dependence upon the FSK input signal, about a voltage corresponding to a center frequency of the FSK input signal, the phase locked loop including means for detecting phase lock;
   a voltage comparator for producing a demodulated output signal;
   means for applying a d.c. reference voltage, corresponding to a nominal center frequency of the FSK input signal, to a first input of the voltage comparator;
   d.c. blocking means comprising a coupling capacitor for coupling the output voltage of the phase locked loop to a second input of the voltage comparator;
   d.c. restoring means for maintaining, during phase lock, the average voltage at said second input of the voltage comparator at substantially said d.c. reference voltage; and
   means responsive to the phase lock detecting means for establishing a determinate state of the coupling capacitor when no phase lock is detected.

2. An FSK demodulator as claimed in claim 1, wherein the d.c. restoring means comprises diode means connected between the first and second inputs of the voltage comparator.

3. An FSK demodulator as claimed in claim 1, wherein the d.c. restoring means comprises two series-connected back-to-back zener diodes connected between the first and second inputs of the voltage comparator.

4. An FSK demodulator as claimed in claim 1, 2, or 3 and including a low pass filter for coupling the output voltage of the phase locked loop to the d.c. blocking means.

5. An FSK demodulator comprising:
- a phase locked loop including a voltage controlled oscillator, means for tuning said oscillator to a nominal center frequency of an FSK signal to be demodulated, a phase detector responsive to an output of said oscillator and to an FSK input signal to produce at an output thereof an output voltage which varies, in dependence upon the FSK input signal, about a voltage corresponding to a center frequency of the FSK input signal, and detecting means for detecting phase lock of said phase locked loop;
- a voltage comparator for producing a demodulated output signal;
- means for producing and applying to a first input of the voltage comparator a reference voltage representative of said nominal center frequency;
- an amplifier stage having an input coupled to the output of the phase detector and having an output;
- a capacitor coupling the output of the amplifier stage to a second input of the voltage comparator;
- d.c. restoring means for providing said second input of the voltage comparator with an average voltage during phase lock substantially equal to said reference voltage; and
- means responsive to said detecting means for establishing a determinate state of said capacitor when no phase lock is detected.

6. An FSK demodulator as claimed in claim 5 wherein the means responsive to said detecting means comprises means for applying substantially said reference voltage to the input of the amplifier stage when no phase lock is detected.

7. An FSK demodulator as claimed in claim 6 wherein the means for applying substantially said reference voltage to the input of the amplifier stage when no phase lock is detected comprises a transistor controlled by said detecting means and having its controlled path connected between the means for producing the reference voltage and the input of the amplifier stage.

8. An FSK demodulator as claimed in claim 5 wherein the means responsive to said detecting means comprises means for applying a determinate voltage to the second input of the voltage comparator when no phase lock is detected.

9. An FSK demodulator as claimed in claim 5, 6, or 8 wherein the d.c. restoring means comprises diode means connected between the first and second inputs of the voltage comparator.

10. An FSK demodulator as claimed in claim 5, 6, or 8 wherein the d.c. restoring means comprises two series-connected back-to-back zener diodes connected between the first and second inputs of the voltage comparator.

11. An FSK demodulator as claimed in claim 5, 6, or 8 and including a low pass filter coupling the output of the phase detector to the input of the amplifier.

* * * * *